United States Patent [19]

Yasuhara

[11] 4,432,319

[45] Feb. 21, 1984

[54] FUEL INJECTION CONTROL SYSTEM FOR A FUEL INJECTION PUMP

[75] Inventor: Seishi Yasuhara, Yokosuka, Japan

[73] Assignee: Nissan Motor Company, Limited, Kanagawa, Japan

[21] Appl. No.: 246,620

[22] Filed: Mar. 23, 1981

[30] Foreign Application Priority Data

Mar. 26, 1980 [JP] Japan .............................. 55-39979[U]
Oct. 31, 1980 [JP] Japan .............................. 55-152022

[51] Int. Cl.³ .......................................... F02D 31/00
[52] U.S. Cl. ...................................... 123/357; 123/494
[58] Field of Search ............... 123/357, 358, 359, 478, 123/494

[56] References Cited

U.S. PATENT DOCUMENTS

| | | | |
|---|---|---|---|
| 3,407,793 | 10/1968 | Lang | 123/357 |
| 3,425,401 | 2/1969 | Lang | 123/357 |
| 3,630,643 | 12/1971 | Gheim | 123/357 |
| 3,636,933 | 1/1972 | Ohtani et al. | 123/357 |
| 3,731,664 | 5/1973 | Tsuzuki et al. | 123/357 |
| 3,797,465 | 3/1974 | Hobo et al. | 123/357 |
| 3,945,360 | 3/1976 | Laufer | 123/449 |
| 3,973,537 | 8/1976 | Williams et al. | 123/357 |
| 4,036,193 | 7/1977 | Kobayashi et al. | 123/357 |
| 4,223,654 | 9/1980 | Wessel et al. | 123/358 |
| 4,318,378 | 3/1982 | Gheim | 123/357 |

FOREIGN PATENT DOCUMENTS

| | | |
|---|---|---|
| 2349553 | 4/1976 | Fed. Rep. of Germany . |
| 53-47802 | 2/1978 | Japan .............................. 123/357 |
| 832739 | 4/1970 | United Kingdom . |
| 1251447 | 10/1971 | United Kingdom . |
| 1287822 | 9/1972 | United Kingdom . |
| 1369495 | 10/1974 | United Kingdom . |
| 1462871 | 1/1977 | United Kingdom . |
| 1554059 | 10/1979 | United Kingdom . |

Primary Examiner—Ira S. Lazarus
Assistant Examiner—Magdalen Moy
Attorney, Agent, or Firm—Lowe, King, Price & Becker

[57] ABSTRACT

An electric actuator responds to a command for control of fuel injection rate. A position sensor including a multiturn spiral resistor senses the position of the actuator as a varying resistance to produce a corresponding position signal for feedback control purposes. The rate of change in the resistance of a potentiometer corresponding to the fuel injection rate in the range of zero to the rate required under full load differs from that in the range of the rate required under full load to the rate required during starting of the pump. The potentiometer includes first and second series connected resistors with different resistances per unit length. The resistance of the first resistor may be nullified during starting of the engine.

37 Claims, 15 Drawing Figures

FUEL INJECTION CONTROL SYSTEM FOR A FUEL INJECTION PUMP

BACKGROUND OF THE INVENTION

The present invention relates to a fuel injection control pump for use with internal combustion engines, and more particularly to a fuel injection control system for a fuel injection pump wherein the operational position of an actuator which controls fuel injection is sensed by a sensor for feedback control purposes.

SUMMARY OF THE INVENTION

The present invention provides a fuel injection control system for a fuel injection pump comprising an electric actuator responsive to a command for taking the corresponding operational position to control the fuel injection rate; and a position sensor including a multiturn potentiometer sensing the position of the actuator as a varying resistance of the resistor to produce a corresponding position signal for feedback control purposes. The rate of change in the resistance of the potentiometer corresponding to the fuel injection rate in the range of zero to the rate required under full load is different from that in the range of the rate required under full load to the rate required during starting of the engine.

BRIEF DESCRIPTION OF THE DRAWINGS

The objects, features and advantages of the present invention will be apparent from the following description of a preferred embodiment and several modifications thereof, taken in conjunction with the drawings in which the same reference numerals designate corresponding parts throughout the drawings and in which.

DETAILED DESCRIPTION OF THE EMBODIMENTS

Figure 1:
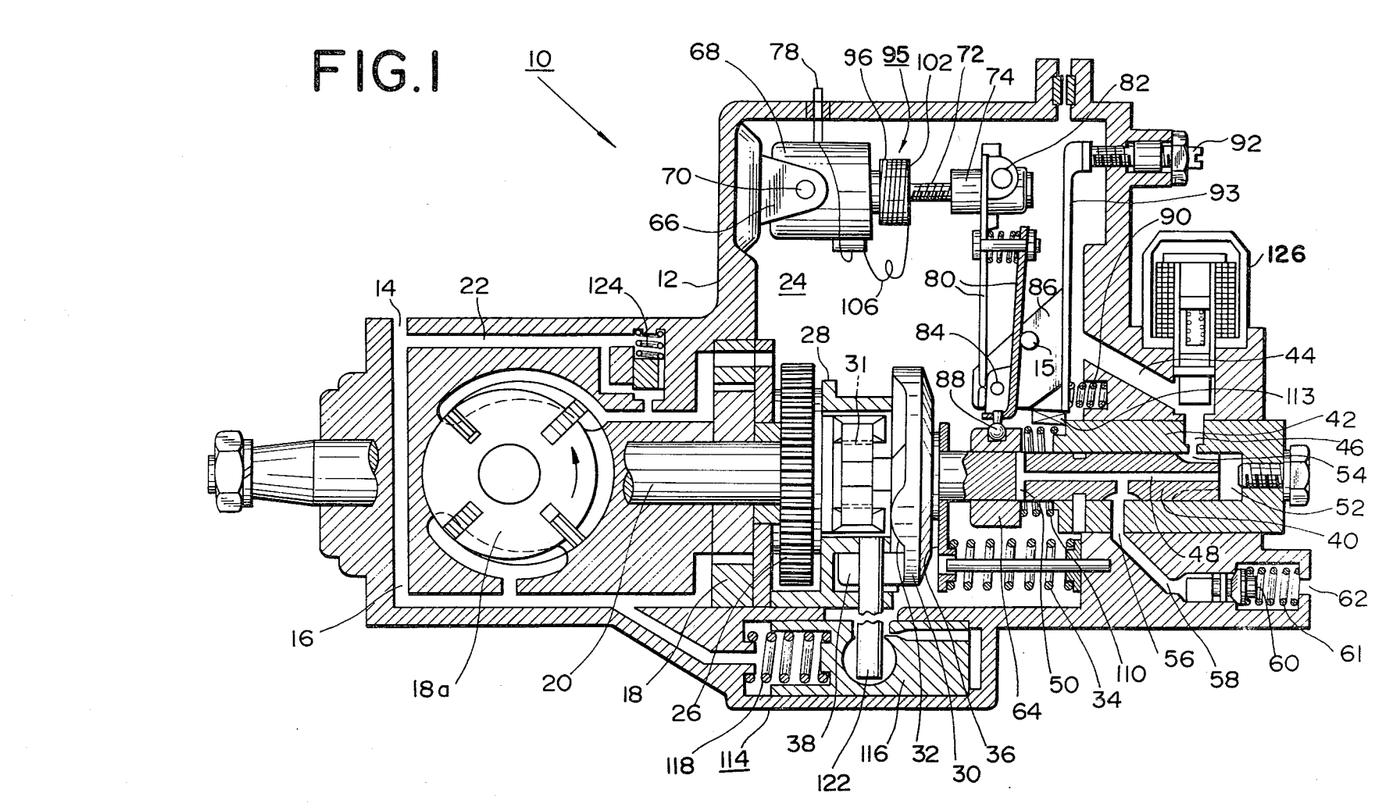
FIG. 1 is a diagrammatic sectional view of a fuel injection system in which a fuel injection control system according to the present invention is incorporated.

Reference is made to the drawings and particularly to FIG. 1, in which is shown a fuel injection pump 10 associated with a fuel injection control system according to the present invention. The pump 10 includes a housing 12 with a fuel inlet 14 and a fuel passageway 16 communicating therewith. A rotary feed pump 18, which is also shown by 18a rotated through 90° in the figure for ease in understanding, is enclosed within the housing 12 and is driven by a drive shaft or crankshaft 20 to which the pump 18 is secured. Pump 18 is coupled with the crankshaft 20 to supply fuel admitted by the inlet 14 through the passage 16 and another passage 22 to a reservoir or pump chamber 24 formed in the housing 12. A disc 26 is fixed to one end of the drive shaft 20 supporting a roller ring 28 such that this roller ring rotates about the axis of the drive shaft 20 relative to the disc 26. A disc 30, which controls the timing for fuel injected into the engine cylinders, not shown, is coupled by keys 31 to the drive shaft such that the disc can easily move axially along the drive shaft while rotating with the drive shaft. The disc 30 has a plurality of cam faces 32, equal in number to the number of engine cylinders. The disc 30 is urged toward the roller ring 28 by a biasing plate 36 and plunger spring 34. The cam disc 30 reciprocates axially through a predetermined cam lift distance when each cam face passes over a roller 38 rotating about a connecting rod 122 on the roller ring 28 while the disc 30 is being rotated by the drive shaft 20.

A pump plunger 40 secured to the disc 30 rotates about and moves axially of the drive shaft 20 in a plunger cylinder 42 when the drive shaft 20 turns. The cylinder 42, secured to the housing 12, is provided with an intake port 46 which communicates with the reservoir 24 through a fuel supply passage 44. The plunger 40 is provided with a central axial passage 48 and a spill port 50 communicating therewith and extending diametrically across the plunger 40 to release the pressure from a plunger pump chamber 52 formed by the plunger 40 and the cylinder 42. The plunger 40 has therein an intake groove 54 through which the intake port 46 and the plunger pump chamber 52 communicate according to the phase of the plunger 40, and a distributor port 56 communicating with the central passage 48 and opening to the side surface of the plunger. Fuel under pressure is fed from the distributor port 56 through one of a plurality of output passages 58, only one of which is shown, provided in the housing 12 to a corresponding delivery valve 60, overcoming the resistance of a spring 61 in the housing 12, and passes through a fuel outlet 62 to an injection nozzle, not shown. A control sleeve or spill ring 64 controls the opening of the spill port 50, as will be described in more detail below.

An electric motor 68, which could be a DC type, driven by an external signal, is pivotally supported at a point 70 on each side of the motor by a bracket 66 fixed to the inner wall of the housing 12. The motor has a threaded drive shaft 72 on which a slider 74 is threaded. As the motor is operated, the slider 74 moves toward or away from the motor 68 along the drive shaft 72 to move a link 80 to position the control sleeve 64 relative to the position of the spill port 50, thereby controlling the termination of fuel injection and hence the amount of fuel injected in response to the motor receiving a command signal through leads 78 from a control device, described later; the control device is disposed outside the housing 12. The link 80, pivoted at point 82 to the slider 74 and at point 84 to an adjustment plate 86, is provided with a ball member 88 which engages the control sleeve 64. The adjustment plate 86 is urged at its lower end toward the cam disc 30 by a spring 90 received in a recess in the wall of the housing 12. Plate 86 is positioned so as to be able to adjust the maximum fuel injection amount by means of a screw 92 threaded through the housing 12 and fixed to one end of an arm 93, the other end of which is fixed to the adjustment plate 86.

A fuel cutoff valve 126 closes the fuel passage 44 when the engine is stopped, for example when the ignition switch is turned off, in order to stop the supply of fuel to the plunger pump chamber 52. A pressure control valve 124 controls the pressure of the fuel supplied from the pump 18 to the reservoir 24.

A fuel injection timing control device 114 includes a plunger piston 116 operated by the pressure of fuel taken therein through the passage 16 and is urged to rest position by a spring 118 disposed on the left-hand side of the plunger, as seen in the figure.

The connecting rod 122 connects the piston 116 and the roller ring 28 so that the roller ring 28 is rotated about the axis of the shaft 20 independently of the disc 26 by the movement of the piston 116. The plunger 116 is moved axially in the casing by the pressure of the fuel from the feed pump 18 to turn the connecting rod 122 about the axis of the shaft 20 by the corresponding angle in order to adjust the timing of the axial movements of the plunger 40 caused by the roller 38 bearing on the cam faces of the disc 30, thereby controlling the timing of fuel injection and the beginning of fuel compression in the plunger pump chamber 52. For easy understanding, the timing control device 114 is shown rotated through 90° about the connecting rod 122.

In operation, fuel is drawn in by the feed pump 18 which is driven by the drive shaft 20 connected to the output shaft of the engine, not shown, from the inlet 14 of the pump. The pressure of the fuel discharged from the pump is regulated by a pressure regulator valve 124 and fed into the pump chamber 24 within the pump housing 12. The fuel within the pump chamber 24 lubricates the elements within the housing and is drawn through the intake port 46 to the plunger pump chamber 52. The plunger 40 is driven by the drive shaft 20 synchronously with the rotation of the engine.

As disc 30 rotates, it rises through a predetermined cam lift each time a cam face 32 rides over the roller 38 disposed in the roller ring 28. Thus the plunger 40 reciprocates while rotating so that the fuel drawn in through the inlet port 46 is fed under pressure through the distribution port 56 and the delivery port 60 to the injection nozzle, not shown. In this case, the timing of the fuel injection can be easily controlled by changing the relative position of the cam faces 32 and the roller 38. On the other hand, the amount of fuel injected is determined by the position of the spill ring 64 which covers the spill port 50 formed on the plunger 40. For example, when the opening of the spill port 50 is moved to the right-hand end of the spill ring 64 by the rightward movement of the plunger 40, the fuel previously fed under pressure from the plunger pump chamber 52 to the distribution port 56 is relieved through the spill port 50 to the pump chamber 24, thereby ending the supply of fuel. That is, if the spill ring 64 is moved to the right relative to the plunger 40, the timing of the end of fuel injection is retarded thereby to increase the amount of fuel injected, while on the contrary, if the spill ring 64 is moved to the left, the timing of fuel injection is advanced, thereby reducing the amount of fuel injected.

When the load on the engine increases, the direct current motor 68 is driven in the normal direction. This causes the slider 74 to be drawn toward the motor 68 so that the link lever 80 is turned about the pivot 84, thereby moving the spill ring 64 to the right. Then during the fuel compression stroke of plunger 40, the time interval during which the spill port 50 is closed by the spill ring 64 increases and as a result the amount of fuel injected to the distribution port 56 increases. When the load decreases, the signal from the control device drives the motor 68 in the reverse direction to move the spill ring 64 to the left of the figure and thus decrease the amount of fuel injected.

If the distance between the pivot 84 of the link lever 80 and the ball 88 is between one fourth and one sixth (and preferably one fifth) of the distance between the pivots 82 and 84, the movement of the slider 74 due to the motor operation is about five times as large as that of the control sleeve 64, thereby providing easy and precise control of the control sleeve.

In FIGS. 1, 2, 3A and 3B, is illustrated a position sensor 95 which includes a disc 96 which rotates with the motor shaft 72; disc 96 is mounted close to one end of the motor. A spiral groove 100 is formed on the circumference of disc 96; a resistor 102, disposed in and wound along the groove senses the position of the spill ring 64. Thus the overall length of the resistor 102 is determined by the the outer diameter of the disc 96 and the total number of rotations of the motor shaft 72. The resistor 102 is connected to the control device, later described, through a support 106 having at one end a moving contact 104 (FIGS. 2 and 3) in sliding contact with the resistor 102. The other end of the support 106 is connected to a terminal 108 secured to the outer casing of the motor 68; the casing is connected to the control device through a lead 110. The contact 104 received within the groove 100 and prevented from slipping out of the groove by a reduced opening 101 of the groove 100, moves along the groove as the disc 96 rotates. When the contact 104 moves along the resistor 102, the resistance between the contact and a reference point (not shown) which may be provided at one end of the disc 96 varies, thereby allowing the position of the slider 74 to be sensed electrically. That is, the movement of the slider 74 is transmitted through the link lever 80 to the spill ring 64 so that the position of the spill ring 64 is detected correctly by the position of the contact 104.

Figure 2:
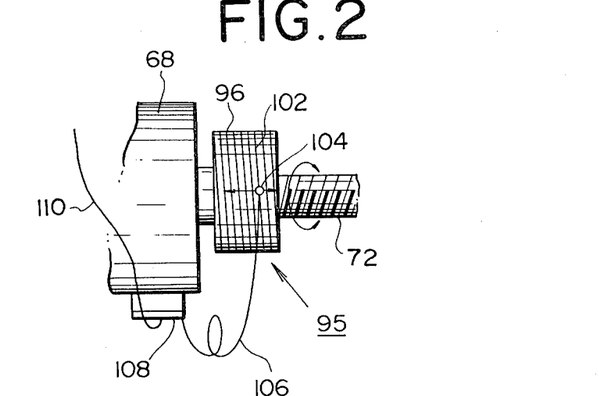
FIG. 2 is an enlarged view of a position sensor secured to the shaft of a motor in a full injection system.
Figure 3A:
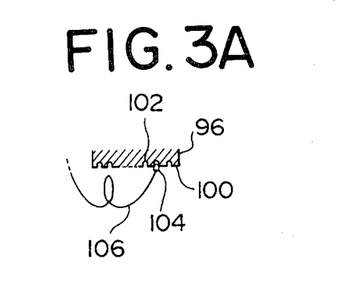
FIG. 3A is an enlarged view of a part of the sensor and FIG. 3B is a much more enlarged view similar to FIG. 3A.
Figure 3B:
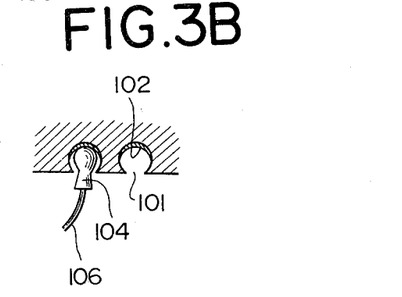

The support 106 is made of an electrically conductive material having good resiliency, whereby the axial movement of the contact 104 is effected satisfactorily by the resiliency of the support. The brackets 66 allow rotation of the link lever 80 through the pivots 70, 82 and 84. A spring 110, disposed between the plunger cylinder 42 and the spill ring 64, absorbs possible play between the respective elements by urging the spill ring 64 to the left. A solenoid 113, which is attached to the lower end of the adjustment plate 86, is energized during the starting of the engine drawing the spill ring 64 to the right of the figure to close the spill port, thereby increasing the amount of fuel injected.

In operation, with this particular distribution type fuel pump, the difference between the position of the spill ring 64 under the maximum load and the position of the spill ring during idling is 0.6 mm at most so that the movement of the slider 74 is 3 to 4 mm which is 0.6 mm multiplied by the ratio of the distances between the pivot points of the link lever 80. The movement of the slider 74 along the motor shaft is provided by the operation of the motor 68. For example, if the pitch of the threads provided in the hole of the slider 74 and the motor shaft 72 is 0.7 mm, and the overall stroke or effective distance of the slider is 3.5 mm, the total number of rotations of the shaft 72 is 5, as obtained by dividing 3.5 mm by 0.7 mm. If more than 5 turns of the resistor 102 are wound on cylinder 96, the contact 104 of the support 106 moves along the spiral groove 100 similarly to the movement of a record needle, thereby allowing resistance values corresponding to the respective positions of the spill ring 64 to be read.

Since the overall length of the resistor 102 is determined by the outer diameter of the disc 96 and the total number of rotations of the shaft 72, the resistor is about 1,600 mm long if the diameter of the cylinder is 100 mm. The precision with which the position of the spill ring 64 is sensed is determined by the effective length of the resistor 102 so that the displacement of the spill ring is detected with considerable accuracy in this particular embodiments.

Figure 4:
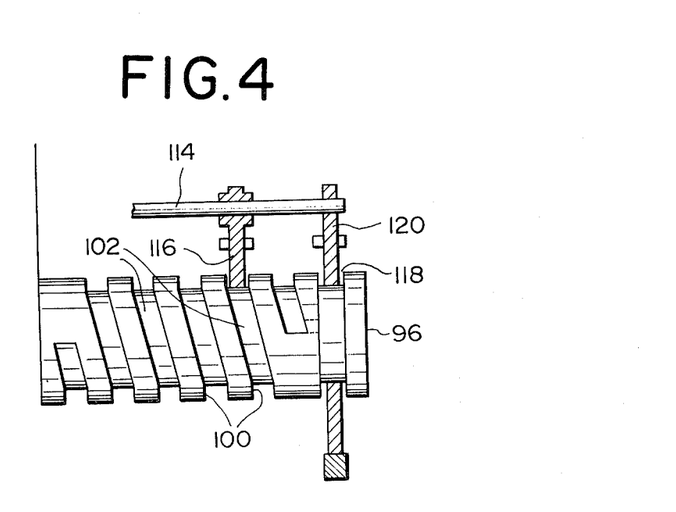
FIG. 4 is a first modification of the sensor.

FIG. 4 is a diagram of a first modification of a position sensor for the control system according to the present invention. In this particular modification, a contact in the form of a brush 116 is provided so as to slide along a fixed rod 114 provided parallel to a cylinder 96 secured to the motor shaft. One end of the rod 114 is supported by a disc-like member 120 slidably fitted in a groove provided at one end of the cylinder 96. The brush 116, connected to the leads 110 as seen in FIG. 2, moves axially contacting the resistor 102 disposed in the spiral groove 100. This modification is suitable for use especially when the distance through which the slider 74 moves is relatively long so that the total number of rotations of the motor shaft is relatively large, and thus a support such as support 106 in FIG. 2 cannot flex so as to allow sufficient axial movement of the contact.

Figure 5:
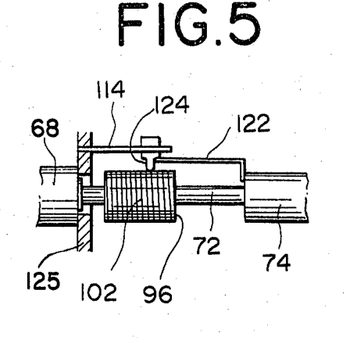
FIG. 5 is a view of a second modification of the sensor.
Figure 6A:
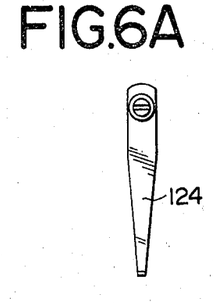
FIG. 6A is a front view of a contact used in the sensor of the second modification of the present invention.
Figure 6B:
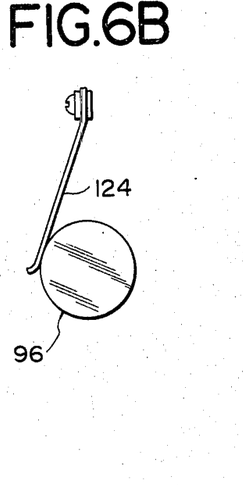
FIG. 6B is a side view of the contact contacting the sensor body.

In FIGS. 5, 6A and 6B, a second modification of the present invention is illustrated as including a brush contact 124 in the form of a tongue which slides along a first support 114 secured at one end to a motor support frame 125 while contacting the spiral resistor 102 on the cylinder 96. The brush contact 124 is also connected through a second rigid support member 122 to the slider 74 so that the brush contact 124 is moved along the motor shaft by the movement of the slider. If the threads of the hole in the slider 74 through which the motor shaft 72 is threaded and the spiral winding of the resistor 102 have the same pitch, no deformation or bending of the contact 124 occurs and the contact 124 can be made of a torque member of a thin or relatively weak material.

Figure 7A:
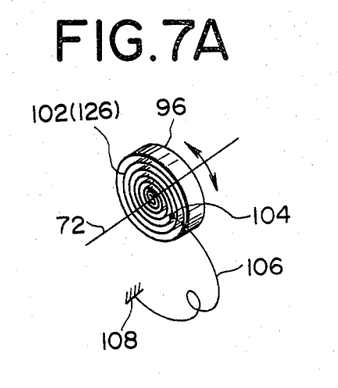
FIG. 7A is a diagrammatic perspective view of a third modification of the sensor.
Figure 7B:
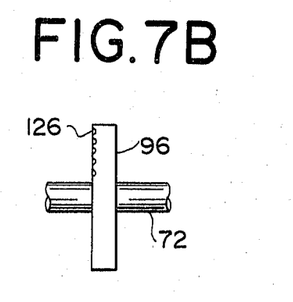
FIG. 7B is a diagrammatic side view of the sensor of FIG. 7A.

In FIGS. 7A and 7B, a third modification of the present invention is shown as including a disc 96 rotating in unison with the motor shaft 72. Spiral resistor 102 is disposed in a spiral groove 126 provided on one side of the disc 96. The contact 104 on the support 106 is in sliding contact with the resistor 102 so that as the disc 96 rotates, the contact moves radially along the groove 126. Of course, the groove has a reduced opening so as to prevent the contact from slipping out of the groove, as in the embodiment of FIG. 3B. This modification has a reduced axial length compared to the cylinder 96 of FIG. 5.

Figure 8:
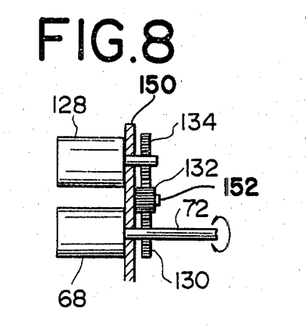
FIG. 8 is a diagrammatic side view of a fourth modification of the sensor associated with the electric motor.

In FIG. 8, a fourth modification of the present invention is illustrated as including a multi-turn potentiometer 128 as a position sensor which is connected to the motor shaft 72 through a drive gear 130 secured to the motor shaft, an idler gear 132 and a follower gear 134 secured to the potentiometer shaft. Potentiometer 128 and DC motor 68 are fixedly mounted on support plate 150, having apertures through which shafts of the motor and potentiometer extend; support shaft 152 for idler gear 132 is mounted on plate 150. This modification can be manufactured inexpensively because multi-turn potentiometers are commercially available. In this particular modification, the potentiometer is usually a 10-turn model, but the total number of turns thereof can be set to any desired value by selecting the gear ratio of the gears 130, 132 and 134.

Briefly, the above embodiments and modifications of the present invention allow very precise measurements on an enlarged scale of the varying resistance of the sensor resistor corresponding to the displacement of the spill ring because the sensor resistor is provided in a multi-turn spiral on the surface or end of a disc or cylinder member.

With these fuel injection control systems, the position of the control sleeve 64 determining the amount of fuel injected corresponds to the position of the slider 74 along the motor shaft. Sensor 128 senses the position of the slider 74 to produce a signal representing the position of the slider and feeds the signal back to a servo circuit 136, shown in FIG. 9. The servo circuit 136 drives the motor 68 in the forward or reverse direction such that the signal e fed back from the potentiometer or sensor 128 equals the command signal e' from a control unit 138, thereby determining the amount of fuel injected. The control unit 138 receives a signal $S_1$ representing the position of an accelerator, a signal $S_2$ representing the speed of the engine, a signal $S_3$ representing the temperature of the engine, a signal $S_4$ representing the fuel injection timing, and other necessary signals to generate a command signal e' to the servomechanism 136.

Figure 10:
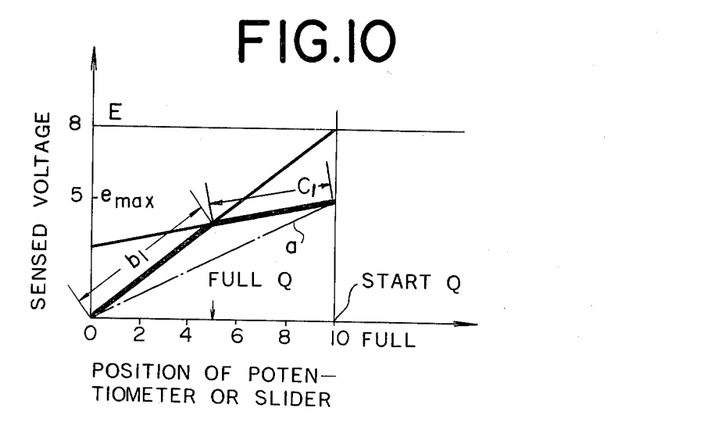
FIG. 10 is a graph showing the relationship between the position of potentiometer and the resistance sensed by the potentiometer.

As will be seen from the above, if the command signal e' is set to be between 0 and 5 volts, the voltage sensed by the potentiometer 128 should be between 0 and 5 volts and the amount of fuel injected in the range of 0 to START Q, in FIG. 10, required during the starting of the engine, should correspond to a value between 0 and 5 volts.

In this case, if the command signal is between 0 and 5 volts, the voltage sensed will be between 0 and 5 volts so that the load voltage E is 5 volts. Thus, the relationship between the position of the potentiometer 128 and the command is shown by the dot-dash line a in FIG. 10; the overall range of the potentiometer 128 corresponds to the overall range of fuel injection from 0 to START Q which is about twice as much as FULL Q injected under full load. The entire voltage range of the potentiometer equals the entire command signal range from 0 to 5 volts. The command signal e' controlling the amount of fuel injected expresses the amount of fuel injected between 0 and START Q, using a value between 0 and 5 volts.

Figure 9:
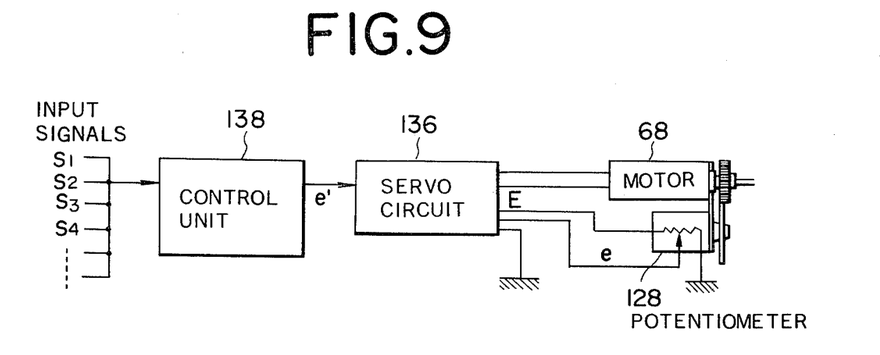
FIG. 9 is a fragmentary sectional view of the whole control system including the fuel injection control modification of the terminal of FIG. 9.

On the other hand, the servo circuit 136 shown in FIG. 9 performs a control operation in such a manner that the sensed output voltage e of the potentiometer 128 falls within the command signal e' + $\alpha$ where $\alpha$ is an error which is determined from the absolute value of the command signal e' and a relative value to the sensed voltage e of the potentiometer 128. Thus, in order to improve the precision of the control, as small a signal range as possible, such as the range of 0 to FULL Q, shown by b₁ in FIG. 10, is preferably be more precisely controlled than the amount of fuel injected controlled from 0 to START Q by using a value between 0 and 5 volts. That is, the control width of fuel injection per unit command signal is preferably as small as possible.

Figure 11:
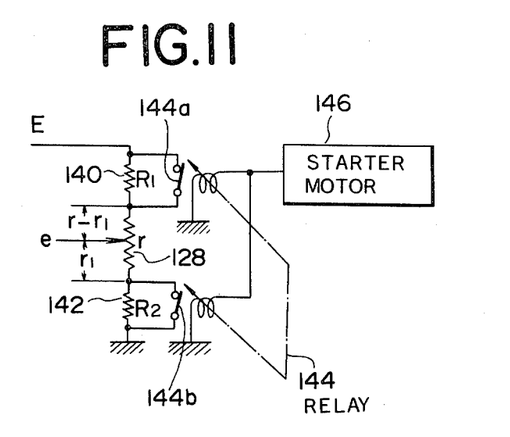
FIG. 11 is a fifth modification of the sensor.

In FIG. 11, a fifth modification of the sensor of the present invention includes a potentiometer resistor 128 and two resistors 140 and 142 connected in series with opposite ends of the resistor 128. A pair of normally closed switches 144a and 144b of a relay 144 normally short-circuit the resistors 140 and 142. Relay 144 is operated together with a starter motor 146 and opens the normally closed switches when the starter motor is fed with power. The resistors 140 and 142 can have any desired values. If the resistors 140 and 142 have resistances of R1 and R2, and the potentiometer has a resistance of r, and more particularly if, for example R1=R2=7.5 KΩ, r=5 KΩ and E=8 V, the sensor has a characterisic defined by r=5 KΩ when the switches 144a and 144b are closed; when the switches 144a and 144b are open, the sensor has a characteristic defined by R1+R2+r=20 KΩ, thereby developing the characteristics represented by the thicker solid line in FIG. 10.

In operation, the switches 144a and 144b are normally closed as shown during the normal operation of the engine so that R1=R2=0. Since E=8 V in this case, however, the voltage corresponding to the position of the moving contact of the potentiometer is as shown by b in FIG. 10 so that the control precision of fuel injection is 40% higher than in the case represented by the straight line a. During the normal operation of the engine, the amount of fuel injected is arranged so as not to reach START Q even if a maximum command signal is be given.

During the starting of the engine, the switches 144a and 144b of the relay 144 operating with the starter motor 146 are opened. Thus the potentiometer voltage e is expressed by:

$$e = [(R_2+r_1)/(R_2+r+R_1)] \times 8 \quad (0 \leq r_1 \leq r)$$

Thus the characteristics of fuel injection follows the straight line c in FIG. 10 so that the range 0 to full Q corresponds to 0 to 4 V, full Q to START Q corresponds to 4 to 5 V. Thus the accuracy with which the amount of fuel is injected is in the range of 0 to FULL Q which is very often used as control is greatly improved.

Figure 12:
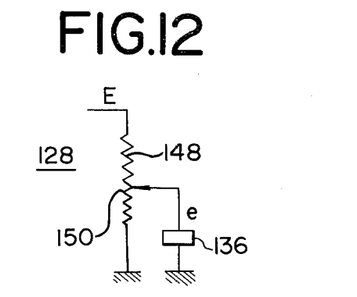
FIG. 12 is a sixth modification of the sensor.

In FIG. 12, a sixth modification of the sensor used in the present invention includes a combination of two different resistors 148 and 150 in the potentiometer 128 so as to obtain the characteristics represented by the thicker solid line derived from the combination of the straight lines b₁ and c₁ in FIG. 10. In this modification, if the resistors 148 and 150 are selected so as to be 1 KΩ and 4 KΩ, respectively and have the same length, the voltage e is sensed as 4 volts at the midpoint of the sweep of the slider of the potentiometer, while the voltage E applied across the combined resistors 148 and 150 is 5 V. Thus, this sensor also generates the characteristics shown by the thicker solid line b₁-c₁ in FIG. 10.

The structures of the two modifications of the sensor shown in FIGS. 11 and 12 can be used in place of the sensor structures described and shown in the preceding embodiment and modifications.

Briefly, according to the last two modifications, most of the predetermined range of command values, for example 0 to 5 V, to control the amount of injected fuel is allotted in the range of 0 to FULL Q so that the amount of fuel injected in the range 0 to FULL Q is controlled with a maximum accuracy while the amount of fuel injected in the range FULL Q to START Q is reliably controlled. The maximum voltage, i.e. 5 V, is used during starting of the engine so that even if a command signal value of 5 V is given, except during starting of the engine, the amount of fuel injected does not reach START Q.

It will be understood by those skilled in the art the foregoing description is made in terms of a preferred embodiment and modifications of the present invention wherein various changes and midifications may be made without departing from the spirit and scope of the invention, as set forth in the appended claims.

What is claimed is:

1. In a fuel injection control system for a fuel injection pump of an internal combustion engine comprising:
   (a) an electric actuator for controlling the fuel injection rate of the pump, the actuator being responsive to a command for taking an operational position corresponding to the command; and
   (b) a position sensor including a multi-turn potentiometer coupled to the actuator for sensing the operational position of said actuator, the position being indicated as a varying resistance at a slider of the potentiometer so that there is derived at the slider a feedback control signal corresponding to the actuator position, the potentiometer having first and second segments over which the slider moves, the first segment having a first rate of change of resistance corresponding to the fuel injection rate in a range from zero to a fuel injection rate required under full load, the second segment having a second rate of change of resistance, the first rate of change being different from the second rate of change in a fuel injection range extending from the rate required under full load to the rate required during starting of the engine.

2. The fuel injection control system of claim 1, wherein said potentiometer includes a first resistor and a second resistor connected thereto, the first and second resistors having different resistances per unit length.

3. The fuel injection control system as claimed in claim 2, wherein said potentiometer further includes means for nullifying the resistance of the first resistor during starting of the engine.

4. The fuel injection control system as claimed in claim 3, wherein said nullifying means includes a relay.

5. The fuel injection control system as claimed in claim 2, 3 or 4, wherein said actuator includes an electric motor having a shaft and a disc secured thereto, the connected first and second resistors being disposed in a multi-turn spiral around the outer circumferential surface of the disc.

6. The fuel injection control system as claimed in claim 2, 3 or 4, wherein said actuator includes an electric motor having a shaft and a disc secured thereto, the connected first and second resistors being disposed in a multi-turn spiral on one side of the disc.

7. The fuel injecting control system as claimed in claim 5, wherein said slider includes a contact sliding along the first and second resistors while contacting the same, and a support means supporting the contact such that the contact can move axially along the disc.

8. The fuel injection control system as claimed in claim 7, wherein said disc includes a multi-turn spiral groove extending around the outer circumferential surface of the disc, said first and second resistors and the contact being disposed in the spiral groove, the groove having a reduced opening so as to prevent the contact from slipping out of the opening of the groove, the support means including an elongated electric conductor having a relatively large resiliency, the elongated conductor being fixed at one end to the contact and at the other end to a stationary point.

9. The fuel injection control system as claimed in claim 7, wherein said disc includes a multi-turn spiral groove extending around the outer circumferential surface thereof, said first and second resistors being disposed in the spiral groove, said support means including a rod extending parallel to the axis of said disc, said contact being attached to said rod so as to slide in the axial direction of said rod.

10. The fuel injection control system as claimed in claim 7, wherein said motor shaft is externally threaded, said actuator including a slider means threaded onto and movable along said externally threaded motor shaft for controlling fuel injection, and said support means being fixed to said slider means.

11. The fuel injection control system as claimed in claim 10, wherein said contact has a tongue form.

12. The fuel injection control system as claimed in claim 6, wherein said slider includes a contact slidable along the first and second resistors while contacting the same, and a support means supporting the contact such that the contact can move radially across the disc.

13. The fuel injection control system as claimed in claim 12, wherein said disc includes a spiral groove on said one side thereof, said first and second resistors and said contact being disposed within said groove, said groove having a reduced opening so as to prevent the contact from slipping out of the groove, the support means being in the form of an electrically conductive elongated member having a relatively large resiliency, the elongated member being fixed at one end to the contact and at the other end to a stationary point.

14. In a fuel injection control system for a fuel injection pump of an internal combustion engine comprising:
(a) an electric actuator for controlling the fuel injection rate of the pump, the actuator being responsive to a command for taking an operational position corresponding to the command; and
(b) a position sensor including a multi-turn potentiometer coupled to the actuator for sensing the operational position of said actuator, the position being indicated as a varying resistance at a slider of the potentiometer so that there is derived at the slider a feedback control signal corresponding to the actuator position, said potentiometer comprising: a rotatable shaft driven rotationally by said actuator and a resistor tracing a spiral path on said shaft, said slider being mechanically and electrically connected to said resistor and free to be driven in a direction oblique to the spiral path of the resistor, whereby as said shaft turns, said slider is driven along said spiral path.

15. The fuel injection control system as claimed in claim 14, wherein said actuator includes an electric motor mechanically coupled to said potentiometer such that said motor drives said potentiometer.

16. The fuel injection control system as claimed in claim 15, wherein said motor includes a shaft, a drive gear secured to said motor shaft, said potentiometer having a shaft, a follower gear secured to said potentiometer shaft, said system including an idler gear meshing with said drive gear and said follower gear such that when the motor is driven, said drive gear drives said potentiometer through said idler gear.

17. The fuel injection control system as claimed in claim 16, wherein the gear ratio of said gears is selected to a predetermined value.

18. The fuel injection control system as claimed in claim 16 or 17, further including a support plate to which said motor and said potentiometer are secured.

19. A fuel injection system for controlling the amount of fuel supplied to an injection nozzle, the system comprising a crankshaft driven pump, a pump chamber and pump plunger, the pump supplying fuel to a metering orifice and thence the nozzle via the pump chamber and the pump plunger, means for controlling the amount of fuel supplied by the pump chamber to the metering orifice via the pump plunger, an electric actuator responsive to a fuel control signal and a feedback control signal for controlling the fuel control means, means for deriving an indication of the amount of supplied fuel, a position sensor coupled to the actuator and the indication deriving means for deriving the feedback control signal as a function of the position of the actuator and the amount of supplied fuel, said sensor including a multi-turn potentiometer having a slider, the slider moving relative to the remainder of the potentiometer in response to the actuator controlling the control means, the magnitude of the feedback control signal being dependent upon the slider position, said potentiometer comprising: a rotatable shaft driven rotationally by said actuator and a resistor tracing a spiral path on said shaft, said slider being mechanically and electrically connected to said resistor and free to be driven in a direction oblique to the spiral path of the resistor, whereby as said shaft turns, said slider is driven along said spiral path.

20. The fuel injection control system of claim 19 wherein the fuel control means includes a variable orifice downstream of the metering orifice, the variable orifice supplying fuel flowing through the plunger back to the pump chamber, the feedback signal being indicative of the extent the variable orifice is open.

21. The fuel injection control system as claimed in claim 19 or 20 wherein said actuator includes an electric motor mechanically coupled to said potentiometer such that said motor drives said slider relative to the remainder of the potentiometer.

22. The fuel injection control system of claim 20 further including fixed resistor means series connected with the potentiometer, and means for short circuiting the fixed resistor means except while the engine is being started, and means for controlling the control means so the variable orifice is closed while the engine is being started.

23. The fuel injection control system as claimed in claim 22 wherein said actuator includes an electric motor mechanically coupled to said potentiometer such that said motor drives said slider relative to the remainder of the potentiometer.

24. The fuel injection control system as claimed in claim 19 further including fixed resistor means series connected with the potentiometer, and means for short circuiting the fixed resistor means except while the engine is being started, and means for controlling the control means so maximum fuel flows through the plunger to the metering orifice while the engine is being started.

25. The fuel injection control system as claimed in claim 24 wherein said actuator includes an electric motor mechanically coupled to said potentiometer such that said motor drives said slider relative to the remainder of the potentiometer.

26. The fuel injection control system as claimed in claim 22, 23, 24 or 25 wherein the fixed resistor means comprises first and second resistors series connected to terminals at opposite ends of the potentiometer.

27. The fuel injection control system of claim 19 wherein the potentiometer includes first and second series connected resistive segments having different slider position versus resistance straight line characteristics, the characteristic of the first segment being associated with starting and having a lower slope than the slope of the second segment not associated with starting, the slider being driven to the first segment and the control means being actuated so maximum fuel flows through the plunger to the metering orifice while the engine is being started.

28. The fuel injection control system of claim 20 wherein the potentiometer includes first and second series connected resistive segments having different slider position versus resistance straight line characteristics, the characteristic of the first segment being associated with starting and having a lower slope than the slope of the second segment not associated with starting, the slider being driven to the first segment and the control means being actuated so the variable orifice is closed while the engine is being started.

29. The fuel injection control system of claim 27 or 28 wherein said actuator includes an electric motor mechanically coupled to said potentiometer such that said motor drives said slider relative to the remainder of the potentiometer.

30. In a fuel injection control system for a fuel injection pump of an internal combustion engine comprising:
(a) an electric actuator responsive to a command for taking an operational position corresponding to the command;
(b) a position sensor including a multi-turn potentiometer having a slider coupled to the actuator for sensing the operational position of said actuator, the position being indicated as a varying resistance at the slider of the potentiometer so that there is derived at the slider a feedback control signal corresponding to the actuator position;
(c) slider means driven by said actuator so as to move toward and away from said actuator, thereby taking an operational position corresponding to said operational position of the actuator;
(d) link lever means having a pivot at an intermediate point along its length, said link lever means having first and second ends, the first end being engaged by said slider means and the link lever means being controlled in pivotal movement about said pivot by movement of said slider means toward and away from the actuator; and
(e) a fuel control means including a control sleeve engaged by the second end of said link lever means, the control sleeve being actuated by the movement of said link lever means to control the termination of fuel injection and hence the amount of fuel injected in accordance with the operational positions of said actuator and slider means.

31. The fuel injection control system as claimed in claim 30, wherein said actuator includes an electric motor mechanically coupled to said potentiometer such that said motor drives said potentiometer.

32. The fuel injection control system as claimed in claim 31, wherein said motor includes a shaft, a drive gear secured to said motor shaft, said potentiometer having a shaft, a follower gear secured to said potentiometer shaft, said system including an idler gear meshing with said drive gear and said follower gear such that when the motor is driven, said drive gear drives said potentiometer through said idler gear.

33. The fuel injection control system as claimed in claim 32, wherein the gear ratio of said gears is selected to a predetermined value.

34. The fuel injection control system as claimed in claim 32 or 33, further including a support plate to which said motor and said potentiometer are secured.

35. The system of claim 19 or 20 wherein the potentiometer includes first and second segments over which the slider moves, the first segment having a first rate of change of resistance corresponding to the fuel injection rate in a range from zero to a fuel injection rate required under full load, the second segment having a second rate of change of resistance, the first rate of change being different from the second rate of change in a fuel injection range extending from the rate required under full load to the rate required during starting of the engine.

36. The system of claim 1 or 19 further including slider means driven by said actuator so as to move toward and away from said actuator, thereby taking an operational position corresponding to said operational position of the actuator, link lever means having a pivot at an intermediate point along its length, said link lever means having first and second ends, the first end being engaged by said slider means, the link lever means being controlled in pivotal movement about said pivot by movement of said slider means toward and away from the actuator, and a fuel control means including a control sleeve engaged by the second end of said link lever means, the control sleeve being actuated by the movement of said link lever means to control the termination of fuel injection and hence the amount of fuel injected in accordance with the operational positions of said actuator and second slider means.

37. A fuel injection system for controlling the amount of fuel supplied to an injection nozzle, the system comprising a crankshaft driven pump, a pump chamber and pump plunger, the pump supplying fuel to a metering orifice and thence the nozzle via the pump chamber and the pump plunger, means for controlling the amount of fuel supplied by the pump chamber to the metering orifice via the pump plunger, an electric actuator responsive to a fuel control signal and a feedback control signal for controlling the fuel control means, means for deriving an indication of the amount of supplied fuel, a position sensor coupled to the actuator and the indication deriving means for deriving the feedback control signal as a function of the position of the actuator and the amount of supplied fuel, said sensor including a multi-turn potentiometer having a slider, the slider moving relative to the remainder of the potentiometer in response to the actuator controlling the control means, the magnitude of the feedback control signal being dependent upon the slider position, said fuel control means including a variable orifice downstream of the metering orifice, the variable orifice supplying fuel flowing through the plunger back to the pump chamber, the feedback signal being indicative of the extent the variable orifice is open, said actuator including an electric motor mechanically coupled to said potentiometer such that said motor drives said slider relative to the remainder of the potentiometer, and said motor including a shaft, a drive gear secured to said motor shaft, said potentiometer having a shaft, a follower gear secured to said potentiometer shaft, said system including an idler gear meshing with said drive gear and said follower gear such that when the motor is driven, said drive gear drives said slider relative to the remainder of the potentiometer.

* * * * *